US012588007B2

(12) United States Patent
Lei et al.

(10) Patent No.: US 12,588,007 B2
(45) Date of Patent: Mar. 24, 2026

(54) SUPER-SLOT FORMAT FOR HALF DUPLEX (HD) FREQUENCY-DIVISION DUPLEX (FDD) (HD-FDD) IN WIRELESS COMMUNICATION

(71) Applicant: QUALCOMM Incorporated, San Diego, CA (US)

(72) Inventors: Jing Lei, San Diego, CA (US); Peter Gaal, San Diego, CA (US); Peter Pui Lok Ang, San Diego, CA (US); Huilin Xu, Temecula, CA (US); Chao Wei, Beijing (CN); Wanshi Chen, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 17/911,991

(22) PCT Filed: Mar. 31, 2020

(86) PCT No.: PCT/CN2020/082270
§ 371 (c)(1),
(2) Date: Sep. 15, 2022

(87) PCT Pub. No.: WO2021/195915
PCT Pub. Date: Oct. 7, 2021

(65) Prior Publication Data
US 2023/0189221 A1    Jun. 15, 2023

(51) Int. Cl.
| | |
|---|---|
| *H04W 72/044* | (2023.01) |
| *H04L 5/16* | (2006.01) |
| *H04W 74/0833* | (2024.01) |

(52) U.S. Cl.
CPC ............. *H04W 72/044* (2013.01); *H04L 5/16* (2013.01); *H04W 74/0833* (2013.01)

(58) Field of Classification Search
CPC .............................. H04W 72/044; H04L 5/16
See application file for complete search history.

(56) References Cited

U.S. PATENT DOCUMENTS

| | | | |
|---|---|---|---|
| 2010/0103860 A1* | 4/2010 | Kim .................. | H04W 72/1268 370/329 |
| 2013/0156009 A1* | 6/2013 | Dinan .................... | H04B 7/046 370/332 |

(Continued)

FOREIGN PATENT DOCUMENTS

| | | |
|---|---|---|
| CN | 104904135 A | 9/2015 |
| CN | 105634713 A | 6/2016 |

(Continued)

OTHER PUBLICATIONS

3GPP: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project, Mobile Competence Centre, 650, Route Des Lucioles, F-06921, Sophia-Antipolis, Cedex, France, vol. RAN WG1, No. V16.0.0, Dec. 2019, Jan. 14, 2020, XP051860806, pp. 1-146, section 12.

(Continued)

*Primary Examiner* — Jael M Ulysse
(74) *Attorney, Agent, or Firm* — Loza & Loza LLP

(57) ABSTRACT

Wireless devices can use various super-slot formats to facilitate wireless communication using half duplex (HD) frequency-division duplex (FDD) (HD-FDD). A super-slot has a duration that can span over multiple slots and/or subframes. A super-slot can include uplink symbols and downlink symbols. The super-slot can include a guard period that separates uplink symbols from downlink sym- (Continued)

bols in the same super-slot. A super-slot can support signal repetition to provide coverage enhancement. Signal repetition can be combined with frequency hopping in a super-slot to provide diversity gain.

50 Claims, 18 Drawing Sheets

(56)                    References Cited

U.S. PATENT DOCUMENTS

| | | | |
|---|---|---|---|
| 2015/0230211 A1* | 8/2015 | You | H04L 5/0051 |
| | | | 370/330 |
| 2015/0257173 A1* | 9/2015 | You | H04L 1/1864 |
| | | | 370/330 |
| 2016/0198504 A1* | 7/2016 | Seo | H04W 72/044 |
| | | | 370/329 |
| 2016/0204921 A1* | 7/2016 | Kim | H04W 72/044 |
| | | | 370/312 |
| 2016/0338022 A1* | 11/2016 | Choi | H04L 5/1469 |
| 2017/0134146 A1* | 5/2017 | Chae | H04W 72/044 |
| 2017/0149552 A1 | 5/2017 | Vejlgaard et al. | |
| 2017/0187416 A1* | 6/2017 | Kim | H04L 25/20 |
| 2017/0188357 A1 | 6/2017 | Visotsky et al. | |
| 2017/0201986 A1* | 7/2017 | Chae | H04B 7/0456 |
| 2017/0230780 A1* | 8/2017 | Chincholi | H04L 1/0036 |
| 2018/0227088 A1* | 8/2018 | Bhattad | H04L 5/0082 |
| 2019/0045495 A1* | 2/2019 | Chen | H04L 5/0044 |
| 2019/0053211 A1* | 2/2019 | Ying | H04W 72/044 |
| 2019/0089506 A1* | 3/2019 | Takeda | H04W 72/0446 |
| 2019/0173523 A1 | 6/2019 | Yeo | |
| 2020/0053777 A1* | 2/2020 | Babaei | H04W 72/04 |
| 2020/0092880 A1* | 3/2020 | Choi | H04L 5/0094 |
| 2020/0186321 A1* | 6/2020 | Hwang | H04W 72/23 |
| 2021/0266139 A1* | 8/2021 | Takeda | H04L 5/0078 |
| 2022/0094481 A1* | 3/2022 | Hong | H04L 1/1812 |
| 2022/0174552 A1* | 6/2022 | Kim | H04L 5/0053 |
| 2022/0312446 A1* | 9/2022 | Choi | H04L 1/1864 |

FOREIGN PATENT DOCUMENTS

| | | | | |
|---|---|---|---|---|
| CN | 106471755 A | 3/2017 | | |
| CN | 109906642 A | 6/2019 | | |
| WO | WO-2017134943 A1 * | 8/2017 | ........... | H04W 72/23 |
| WO | WO-2020016939 A1 * | 1/2020 | ........... | H04W 28/06 |

OTHER PUBLICATIONS

3GPP TS 38.211: "3rd Generation Partnership Project, Technical Specification Group Radio Access Network, NR, Physical Channels and Modulation (Release 16)", DRAFT38211-G10, 3rd Generation Partnership Project, Mobile Competence Centre, 650, Route Des Lucioles, F-06921 Sophia-Antipolis Cedex, France, V16.1.0, Mar. 25, 2020, XP051867606, pp. 1-130, section 4.4.5.

Abinader F., et al., "Impact of Bandwidth Part (BWP) Switching on 5G NR System Performance", 2019 IEEE 2nd 5G World Forum (5GWF), IEEE, Sep. 30, 2019, XP033665220, pp. 161-166, p. 1, right-hand column, line 16-right-hand column, line 22.

ETRI: "Remaining Details on RACH Procedure", 3GPP Draft, 3GPP TSG RAN WG1 Meeting #90bis, R1-1718004, 3rd Generation Partnership Project, Mobile Competence Centre, 650, Route Des Lucioles, F-06921 Sophia-Antipolis Cedex, France, vol. RAN WG1, No. Prague, Czech, Oct. 9, 2017-Oct. 13, 2017, Oct. 8, 2017, XP051341186, pp. 1-9, p. 2, line 2-line 6, p. 1, line 27-line 33, figure 2.

Supplementary European Search Report—EP20928929—Search Authority—The Hague—Dec. 5, 2023.

International Search Report and Written Opinion—PCT/CN2020/082270—ISA/EPO—Jan. 6, 2021.

Mediatek Inc: "Physical Layer Structure for NR Sidelink", 3GPP Draft, 3GPP TSG RAN WG1 Meeting #94bis, R1-1810453_ Physical Layer Structure for NR Sidelink, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2108-Oct. 12, 2018, Sep. 29, 2018 (Sep. 29, 2018), XP051517862,9 Pages, p. 6, par. below Proposal 6.

* cited by examiner

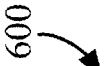
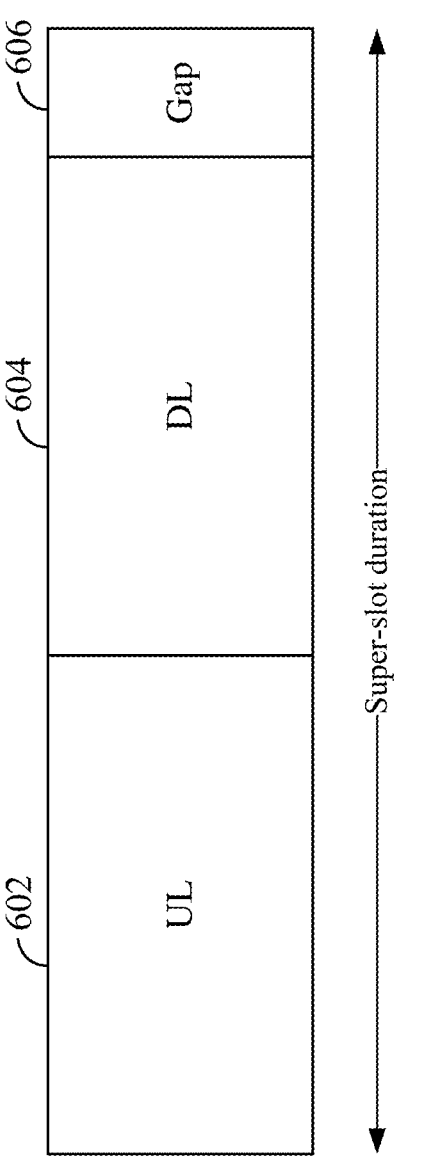
FIG. 6

1600

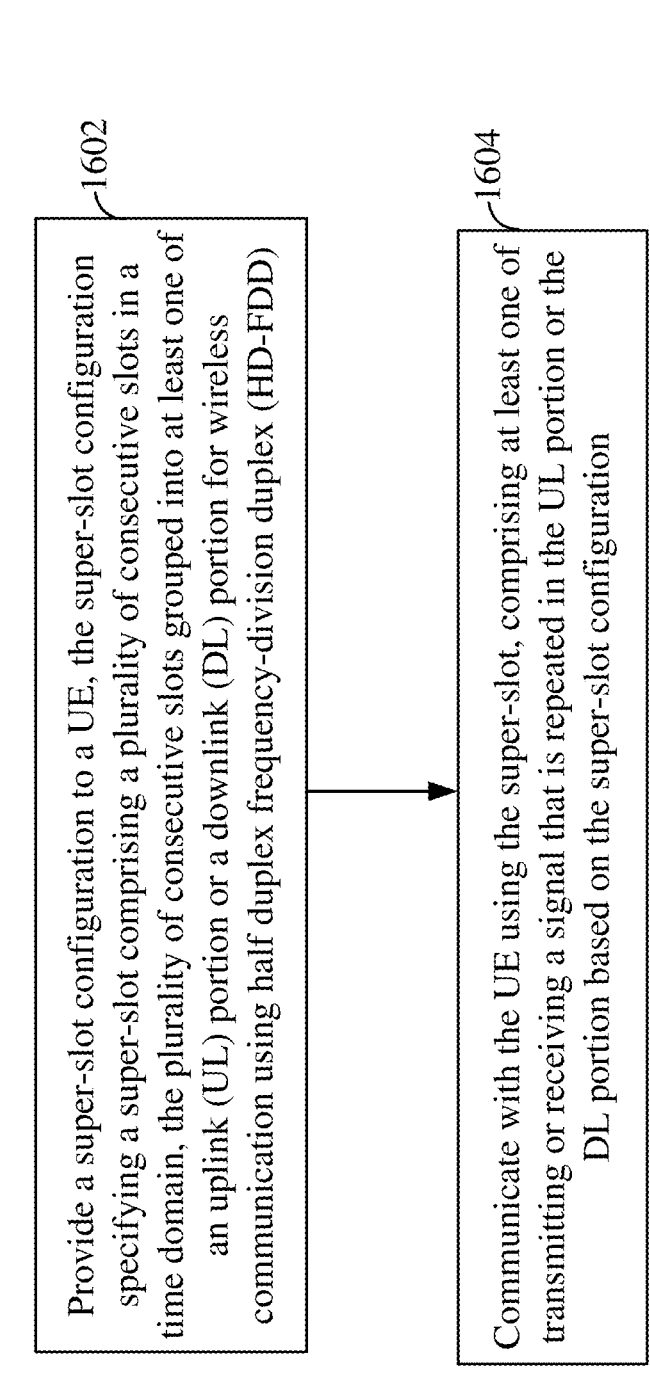

1602

Provide a super-slot configuration to a UE, the super-slot configuration specifying a super-slot comprising a plurality of consecutive slots in a time domain, the plurality of consecutive slots grouped into at least one of an uplink (UL) portion or a downlink (DL) portion for wireless communication using half duplex frequency-division duplex (HD-FDD)

1604

Communicate with the UE using the super-slot, comprising at least one of transmitting or receiving a signal that is repeated in the UL portion or the DL portion based on the super-slot configuration

Receive a slot configuration that specifies a slot comprising at least one of an uplink (UL) portion or a downlink (DL) portion for wireless communication with a scheduling entity using half duplex frequency-division duplex (HD-FDD)

1804

Communicate with the scheduling entity using the slot, comprising at least one of transmitting or receiving a signal that is repeated in the UL portion or the DL portion based on the slot configuration

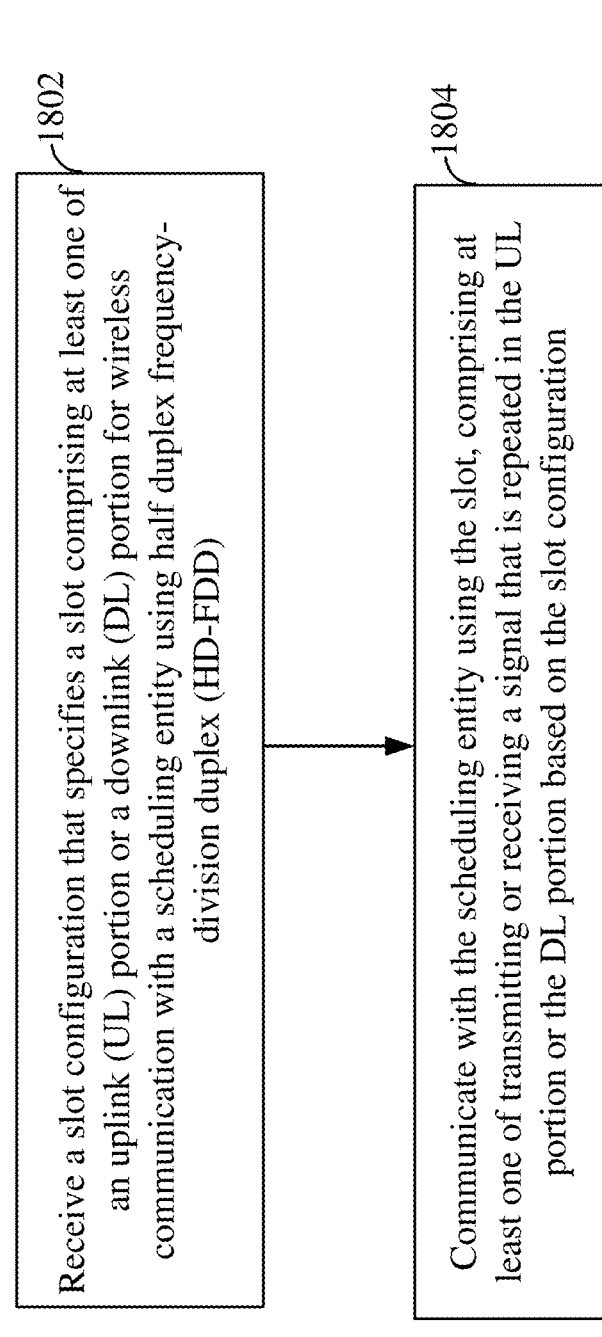

FIG. 18

SUPER-SLOT FORMAT FOR HALF DUPLEX (HD) FREQUENCY-DIVISION DUPLEX (FDD) (HD-FDD) IN WIRELESS COMMUNICATION

CROSS-REFERENCE TO RELATED APPLICATION(S)

This application is the U.S. national stage of PCT patent application number PCT/CN2020/082270 filed on Mar. 31, 2020.

TECHNICAL FIELD

The technology discussed below relates generally to wireless communication systems, and more particularly, to a super-slot format for wireless communication using half duplex frequency-division duplex (HD-FDD).

INTRODUCTION

In a fifth-generation (5G) New Radio (NR) access network, communication between the network and a user equipment may utilize frequency division duplex (FDD) or time division duplex (TDD). In TDD, transmissions in different directions on a given channel are separated from one another using time division multiplexing. That is, at some times the channel is dedicated for transmissions in one direction, while at other times the channel is dedicated for transmissions in the other direction. In FDD, the transmitter and receiver at each endpoint operate at different carrier frequencies or bands (i.e., frequency division multiplexing). Full duplex (FD) means both endpoints (e.g., transmitter and receiver) can simultaneously communicate with one another in both directions. Half duplex (HD) means only one endpoint can send information to the other at a time. To support full duplex communication using FDD, a wireless device can use a duplexer to allow a same antenna to be used for both transmitting and receiving at the same time for full duplex communication.

As the demand for mobile broadband access continues to increase, research and development continue to advance wireless communication technologies, for example, FDD operations not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a method of wireless communication at a scheduling entity. The scheduling entity provides a super-slot configuration to a user equipment (UE). The super-slot configuration specifies a super-slot that includes a plurality of consecutive slots in a time domain The plurality of consecutive slots are grouped into at least one of an uplink (UL) portion or a downlink (DL) portion for wireless communication using half duplex frequency-division duplex (HD-FDD). The scheduling entity further communicates with the UE using the super-slot, including at least one of transmitting or receiving a signal that is repeated in the UL portion or the DL portion based on the super-slot configuration.

Another aspect of the disclosure provides a method of wireless communication at a UE. The UE receives a super-slot configuration that specifies a super-slot including a plurality of consecutive slots in a time domain The plurality of consecutive slots are grouped into at least one of an UL portion or a DL portion for wireless communication with a scheduling entity using half duplex frequency-division duplex (HD-FDD). The UE communicates with the scheduling entity using the super-slot, comprising at least one of transmitting or receiving a signal that is repeated in the UL portion or the DL portion based on the super-slot configuration.

Another aspect of the disclosure provides an apparatus for wireless communication. The apparatus includes a communication interface configured to communicate with a user equipment (UE), a memory, and a processor operatively coupled with the communication interface and the memory. The processor and the memory are configured to provide a super-slot configuration to the UE. The super-slot configuration specifies a super-slot comprising a plurality of consecutive slots in a time domain, and the plurality of consecutive slots are grouped into at least one of an UL portion or a DL portion for wireless communication using HD-FDD. The processor and the memory are further configured to communicate via the communication interface, with the UE using the super-slot, including at least one of transmitting or receiving a signal that is repeated in the UL portion or the DL portion based on the super-slot configuration.

Another aspect of the disclosure provides a user equipment (UE) for wireless communication. The UE includes a communication interface configured to communicate with a scheduling entity, a memory, and a processor operatively coupled with the communication interface and the memory The processor and the memory are configured to receive a super-slot configuration that specifies a super-slot comprising a plurality of consecutive slots in a time domain The plurality of consecutive slots are grouped into at least one of an UL portion or a DL portion for wireless communication with the scheduling entity using HD-FDD. The processor and the memory are further configured to communicate via the communication interface, with the scheduling entity using the super-slot, including at least one of transmitting or receiving a signal that is repeated in the UL portion or the DL portion based on the super-slot configuration.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

3

BRIEF DESCRIPTION OF THE DRAWINGS

FIG. 6 is a block diagram illustrating a second exemplary super-slot for HD-FDD communication according to some aspects of the disclosure.

FIG. 16 is a flow chart illustrating an exemplary process for wireless communication using a super-slot according to some aspects of the disclosure.

FIG. 18 is a flow chart illustrating an exemplary process for wireless communication using a super-slot according to some aspects of the disclosure.

DETAILED DESCRIPTION

Figure 1:
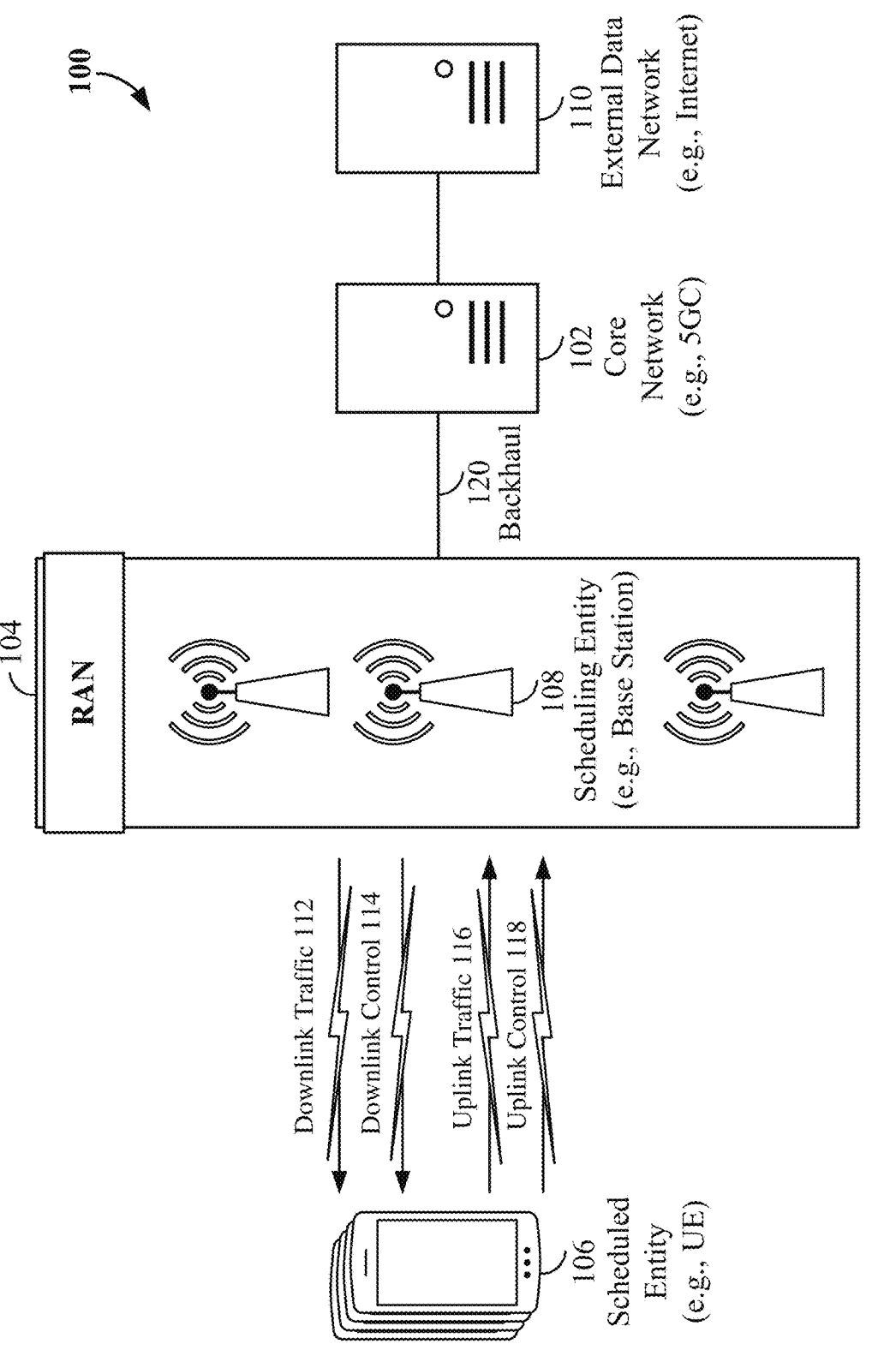
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide methods and apparatus for wireless communication using half duplex (HD) frequency-division duplex (FDD) (HD-FDD). Using HD-FDD in wireless communication can reduce the complexity and/or cost of a wireless device that is capable of using one or more FDD bands for wireless communication. Each FDD band may include one more paired bands for uplink and downlink communication. In some aspects of the disclosure, a user equipment (UE) can replace a duplexer or similar device with a more economical switch for sharing an antenna between uplink and downlink communication when using HD-FDD. In wireless communication, a duplexer isolates the receiver from the transmitter while permitting them to share a common antenna. In some aspects of the disclosure, a UE can support HD-FDD in various frequency bands, for example, NR frequency range 1 (FR1) that includes sub-6 GHz frequency bands. During HD-FDD communication, the UE only transmits or receives signals using the corresponding frequency bands.

Aspects of the present disclosure provide various super-slot formats to facilitate wireless communication using HD-FDD. A super-slot has a duration that can span over multiple slots and/or subframes. In some aspects, a super-slot may include uplink symbols and downlink symbols. The super-slot may further include a guard period that separates uplink symbols from downlink symbols in the same super-slot. The guard period can facilitate DL-to-UL switching at the UE, in particular, when the UL transmission immediately follows the DL transmission. In some aspects, a super-slot can support signal repetition to provide coverage enhancement. In some aspects, slot and/or mini-slot based repetitions can be applied to DL and/or UL communication. In some aspects of the disclosure, signal repetition can be combined with frequency hopping in a super-slot to provide diversity gain.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
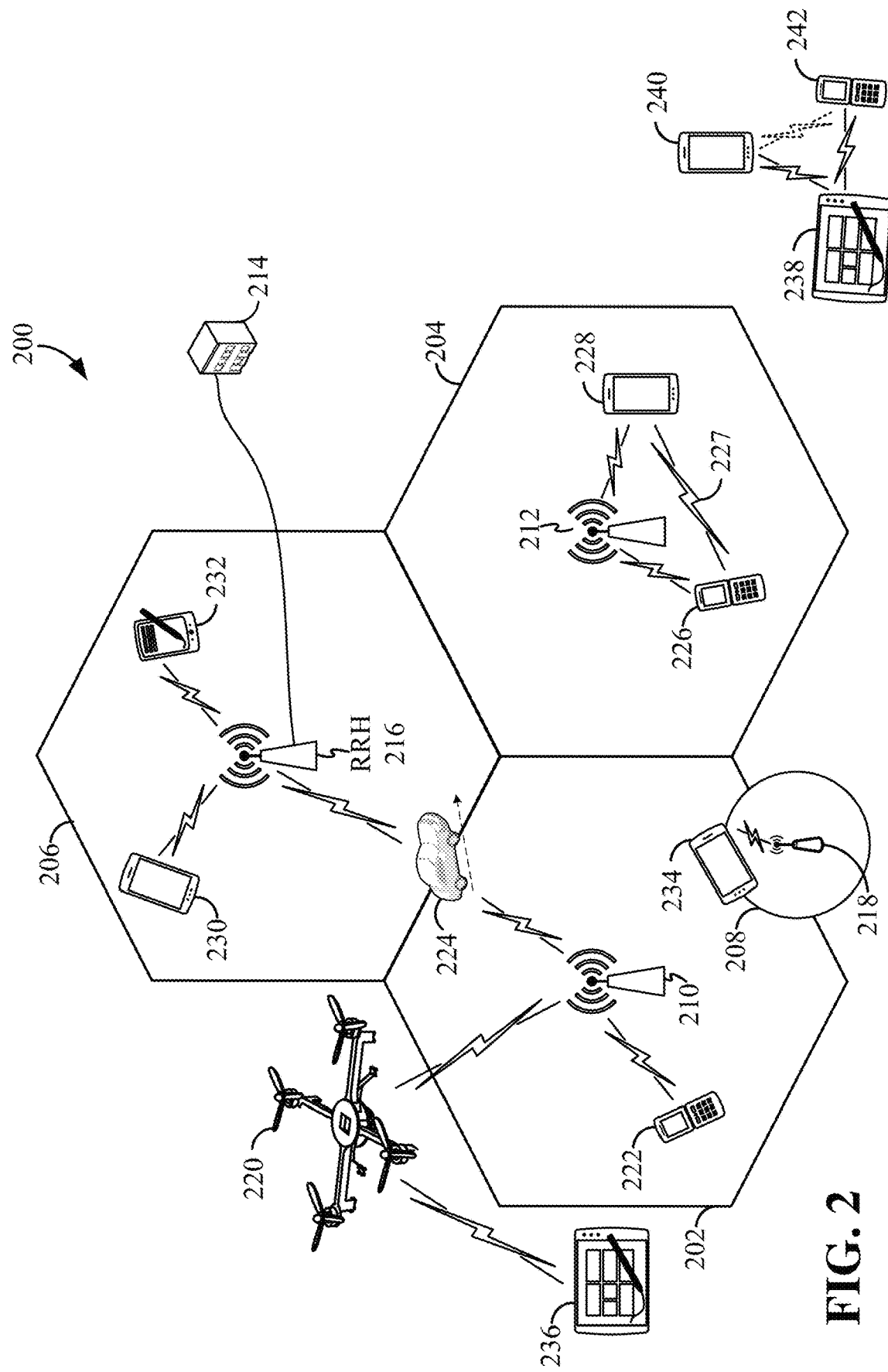
FIG. 2 is a conceptual illustration of an example of a radio access network according to some aspects of the disclosure.

FIG. 2 is a conceptual illustration of an example of a radio access network (RAN) 200 according to some aspects. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In some aspects of the disclosure, a UE can communicate with a base station using HD-FDD. During HD-FDD communication, a UE performs either uplink (UL) transmission or DL reception at a time in different frequency bands for UL and DL in various super-slot formats that will be described in more detail below.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a multiple-input multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
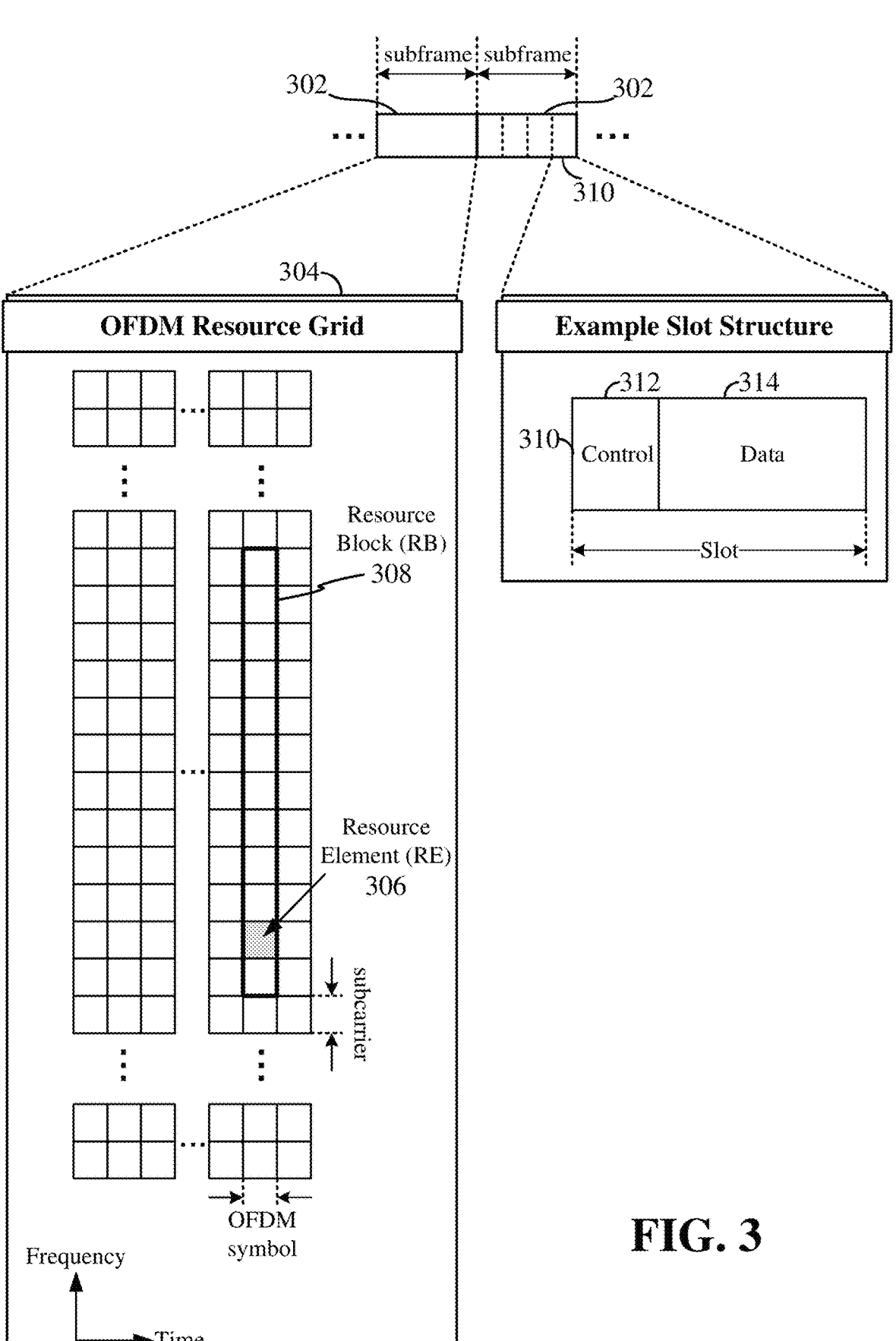
FIG. 3 is a schematic illustration of an organization of wireless resources in an air interface utilizing orthogonal frequency divisional multiplexing (OFDM) according to some aspects of the disclosure.

Although not illustrated in FIG. 3, the various REs 306 within an RB 308 may be scheduled to carry one or more physical channels, including control channels, shared channels, data channels, etc. Other REs 306 within the RB 408 may also carry pilots or reference signals. These pilots or reference signals may provide for a receiving device to perform channel estimation and/or measurement of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
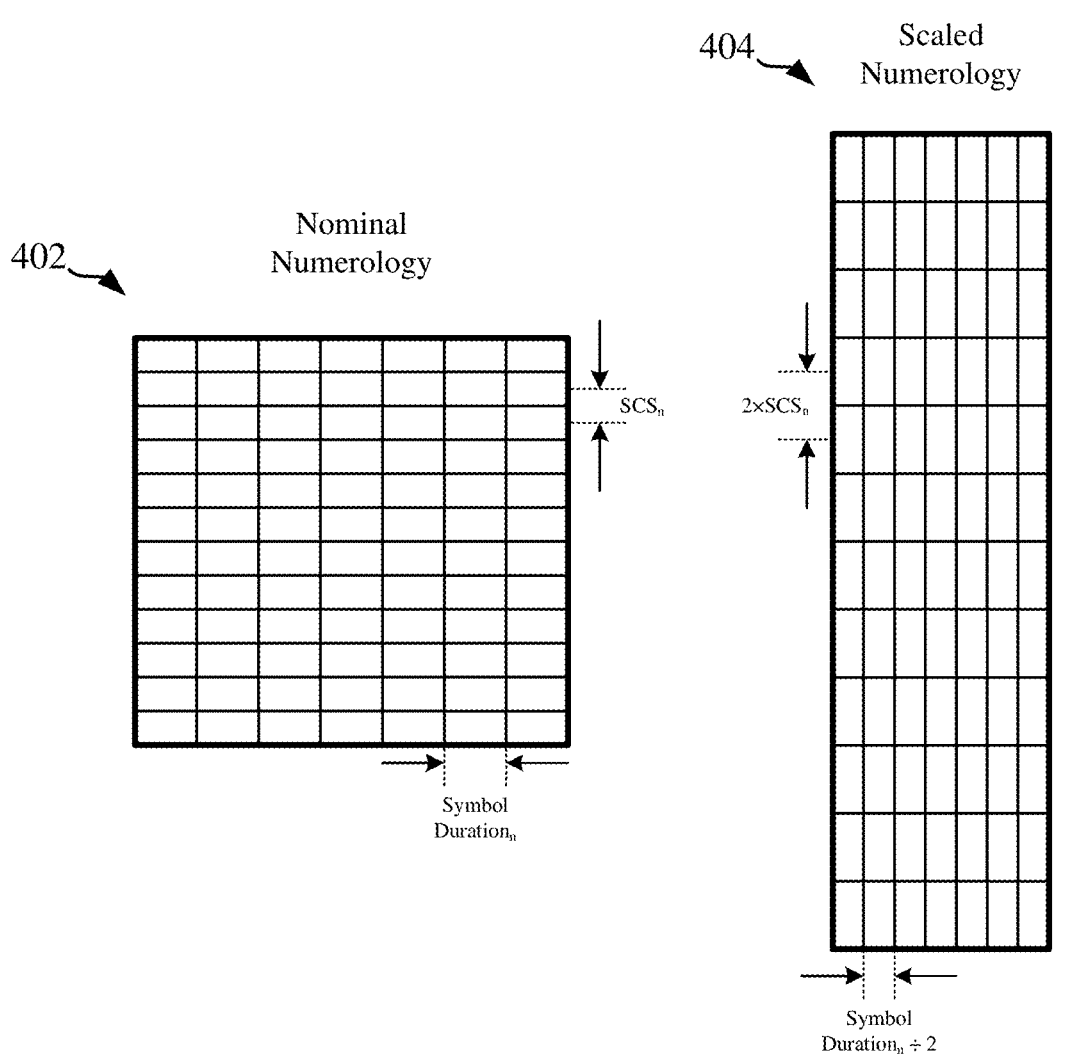
FIG. 4 is a schematic illustration of an OFDM air interface utilizing a scalable numerology according to some aspects of the disclosure.

To illustrate this concept of a scalable numerology, FIG. 4 shows a first RB 402 having a nominal numerology, and a second RB 404 having a scaled numerology. As one example, the first RB 402 may have a 'nominal' subcarrier spacing $(SCS_n)$ of 30 kHz, and a 'nominal' symbol duration$_n$ of 333 μs. Here, in the second RB 404, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 μs.

Aspects of the present disclosure provide various super-slot formats that can facilitate HD-FDD communication in a wireless network. In some examples, a UE can use any of the disclosed super-slot formats to communicate with an NR network (e.g., RAN 200) using HD-FDD. A super-slot can have a time duration that spans multiple regular slots and/or subframes. A regular slot or subframe may be a slot or subframe based on the numerology of a communication frame. A super-slot may have at least one uplink (UL) portion and at least one downlink (DL) portion. The uplink portion can be separated from the downlink portion by a time gap to facilitate communication direction switching.

Figure 5:
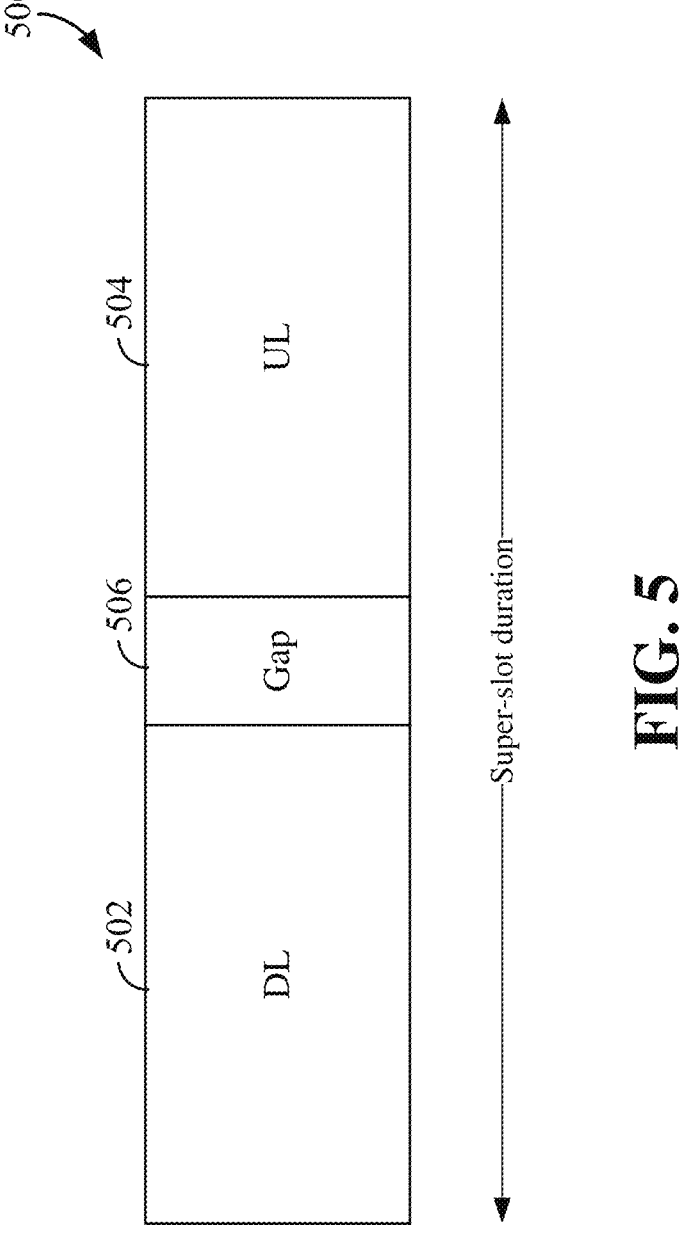
FIG. 5 is a block diagram illustrating a first exemplary super-slot for half duplex frequency-division duplex (HD-FDD) communication according to some aspects of the disclosure.
Figure 7:
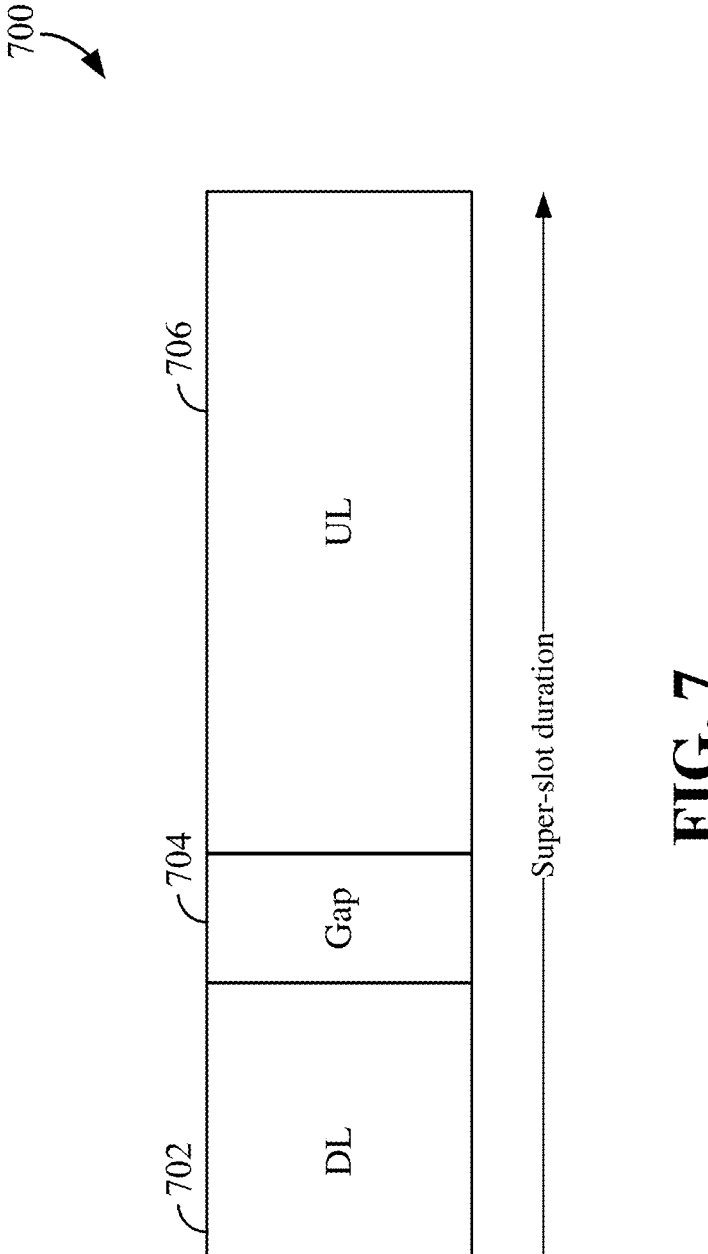
FIG. 7 is a block diagram illustrating a third exemplary super-slot for HD-FDD communication according to some aspects of the disclosure.
Figure 8:
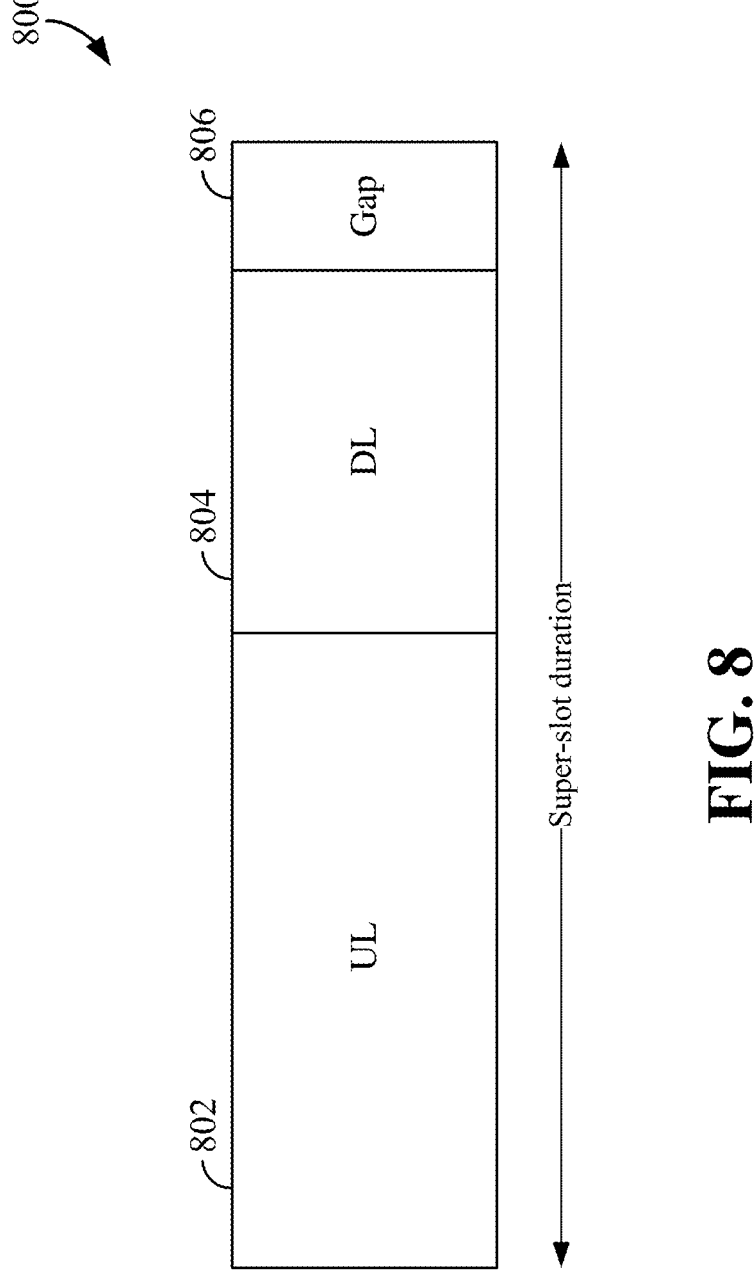
FIG. 8 is a block diagram illustrating a fourth exemplary super-slot for HD-FDD communication according to some aspects of the disclosure.

FIG. 5 is a block diagram illustrating a super-slot 500 for HD-FDD communication according to some aspects of the disclosure. FIG. 5 shows a time-domain representation of a super-slot with a time duration that can span over one or more slots or subframes. The super-slot 500 has a DL portion 502 and an UL portion 504. The DL portion 502 and UL portion 504 may occupy different frequency bands. In some examples, the DL portion 502 and UL portion 504 may have the same or different numerologies. The UL portion 504 may be separated from the DL portion 502 by a gap portion 506 for switching a communication direction between DL and UL. Each of the DL portion 502 and UL portion 504 may include one or more symbols (e.g., OFDM symbols). In some examples, the super-slot 500 may have no UL portion or DL portion. In one aspect, the DL portion 502 and the UL portion 504 may be equal in time duration. However, the DL portion 502 and UL portion 504 may be different in time duration, for example, as illustrated in FIGS. 7-8.

A scheduling entity (e.g., gNB) may transmit downlink signals using the DL portion 502 of the super-slot 500. In some examples, one or more DL symbols may be used for transmitting various DL signals, for example, a physical downlink control channel (PDCCH), a physical downlink shared channel (PDSCH), and/or channel-state information reference signals (CSI-RS). The scheduling entity may transmit the DL signals with or without repetitions. Repetition of the signals can extend the reach of the signals. In some examples, repetition may be used with frequency hopping for diversity gain. For example, the scheduling entity may transmit the repeated signals using different frequencies in the DL portion. Signal repetition will be described in more detail below.

A scheduled entity (e.g., UE) may transmit UL signals using the UL portion 504 of the super-slot 500. In some examples, one or more UL symbols may be used for transmitting various UL signals, for example, a physical uplink shared channel (PUSCH), a physical uplink control channel (PUCCH), and/or sounding reference signals (SRS), with or without repetitions. In some examples, repetition may be used with frequency hopping for diversity gain. For example, the scheduled entity may transmit the repeated UL signals using different frequencies in the UL portion.

The duration of the gap portion 506 may be equal to or greater than a guard period for facilitating DL-to-UL switching in HD-FDD communication. During DL-to-UL switching, the guard period ensures that the UE has sufficient time to reconfigure its circuitry (e.g., retuning RF circuits) for UL communication, if needed. In some aspects of the disclosure, the duration of the gap portion 506 can be an integer number of UL symbols of the super-slot, according to the numerology of the active UL bandwidth part (BWP) of the UL component carrier (CC).

The total duration (super-slot duration) of the super-slot 500 is the sum of the durations of the DL portion 502, UL portion 504, and gap portion 506. In one aspect, the number of symbols in a super-slot may be equal to $K \times N_{symb}^{slot}$, where $K \geq 1$, $N_{symb}^{slot}$ stands for the number of symbols per reference slot. A reference slot may have a duration that is based on the maximum subcarrier spacing (SCS) of the DL and UL symbols. In some examples, the reference slot may be a slot based the maximum SCS of the DL portion and UL portion. In one example, when a super-slot has the same number of symbols as a reference slot, the UL portion and DL portion each correspond to one or more mini-slots.

FIG. 6 illustrates a super-slot 600 according to some aspects of the disclosure. The super-slot 600 is different from the super-slot 500, for example, in the relative position of an UL portion 602, a DL portion 604, and a gap portion 606. The DL portion 604 follows the UL portion 602 in time, and the gap portion 606 follows the DL portion. In some aspects, the super-slot 600 may not have an UL portion or DL portion. In this example, there is no time gap between the UL portion 602 and the DL portion 604. When a UE transmits UL signals using the UL portion 602, the UE knows the switching time between the UL portion 602 and DL portion 604. Therefore, the UE can finish UL transmission before the end of the UL portion 602 such that the UE has time to retune its RF circuitry for DL communication during the DL portion 604. The gap portion 606 provides the time for RF retuning for the next super-slot that may begin with an UL portion, like UL portion 602. Other aspects of the super-slot 600 that are similar to that of the super-slot 500 will not be repeated here to avoid redundancy.

FIG. 7 is a block diagram illustrating a super-slot 700 according to some aspects of the disclosure. The super-slot 700 is different from the super-slot 500 in the relative duration of a DL portion 702, a gap portion 704, and an UL portion 706. For example, the DL portion 702 is shorter in time than the UL portion 706. The super-slot 700 is similar to the super-slot 500 so that aspects of the super-slot 700 that are similar to that of the super-slot 500 will not be repeated here to avoid redundancy.

FIG. 8 is a block diagram illustrating a super-slot 800 according to some aspects of the disclosure. The super-slot 800 is different from the super-slot 600 in the relative duration of an UL portion 802, a DL portion 804, and a gap portion 806. For example, the UL portion 802 is longer in time than the DL portion 804. The super-slot 800 is similar to the super-slot 600 so that aspects of the super-slot 800 that are similar to that of the super-slot 600 will not be repeated here to avoid redundancy.

Figure 9:
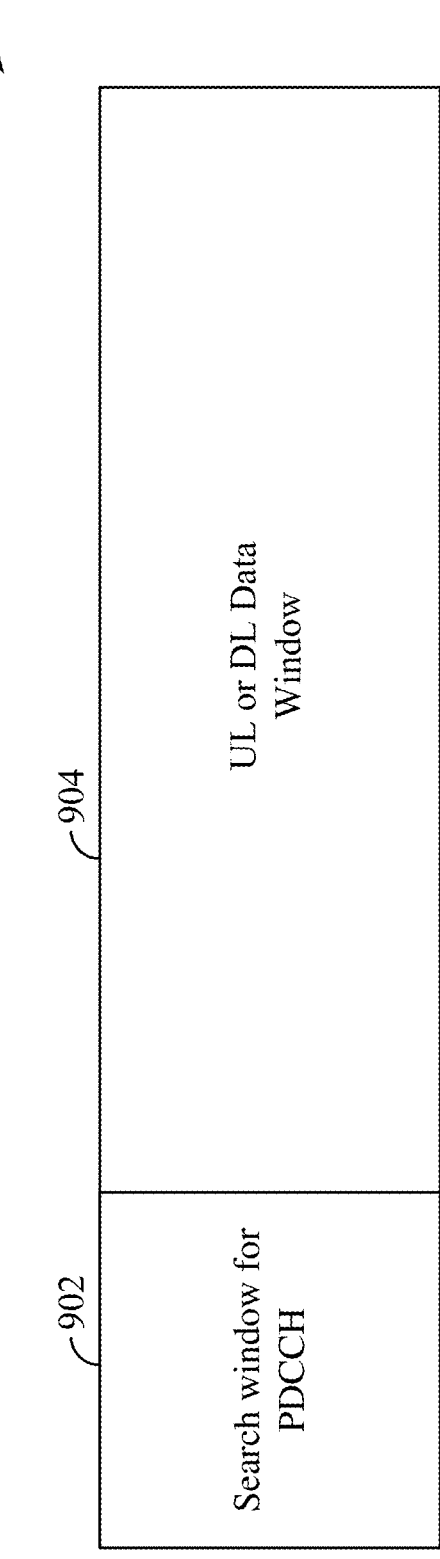
FIG. 9 is a block diagram illustrating a search window and a data window of an exemplary super-slot according to some aspects of the disclosure.

FIG. 9 is a block diagram illustrating a search window and a data window of a super-slot 900 according to some aspects of the disclosure. The search window 902 may correspond to a search space of a PDCCH that belongs to the DL portion of the super-slot. The data window 904 may be any of the UL or DL portions of the super-slots described above in relation to FIGS. 5-8. The super-slot has at least one search window (e.g., search window 902) and at least one data window (e.g., data window 904). In one example, a scheduling entity may repeat the transmission of a downlink control channel (e.g., PDCCH) for a predetermined number of times in the search window 902. In one example, the scheduling entity may repeat the transmission of a downlink data channel (e.g., PDSCH) for a predetermined number of times in the data window 904. In some examples, the scheduling entity may repeat CSI-RS for a predetermined number of times in the search window 902 and/or data window 904. Similarly, a scheduled entity (e.g., UE) may repeat the transmission of an uplink control channel (e.g., PUCCH) for a predetermined number of times in the data window 904. In one example, the scheduled entity may repeat the transmission of an uplink data channel (e.g., PUSCH) for a predetermined number of times in the data window 904. In some examples, the scheduled entity may repeat an SRS for a predetermined number of times in the data window 904.

Figure 10:
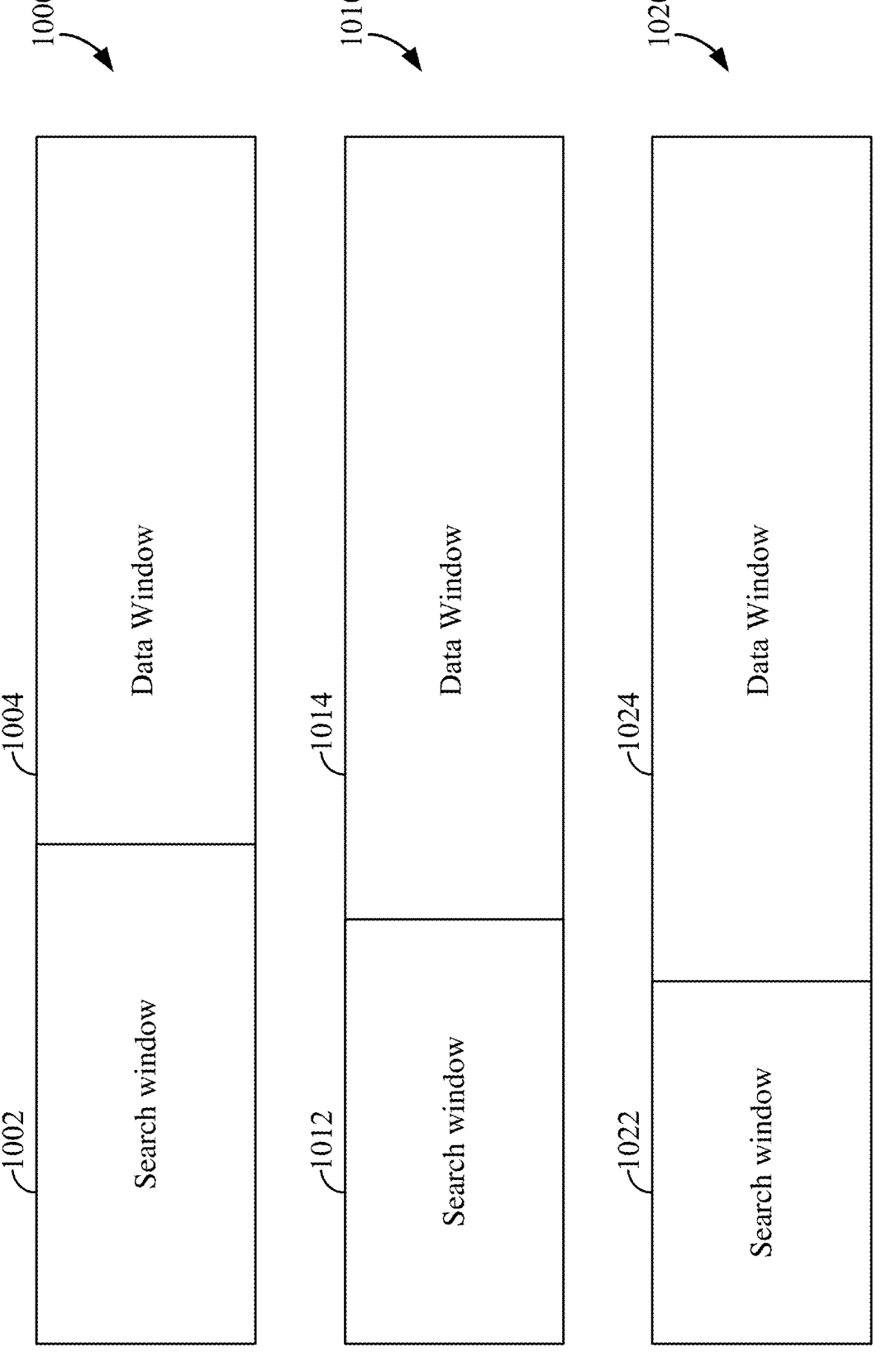
FIG. 10 is a block diagram illustrating an UL or DL portion of a super-slot according to some aspects of the disclosure.

In some aspects of the disclosure, the scheduling entity may dynamically schedule the number of signal repetitions and/or size of the search/data window for each UE based on a common configuration of super-slot format. FIG. 10 is a block diagram illustrating exemplary super-slots for HD-FDD according to some aspects of the disclosure. A scheduling entity may configure a first UE to use a first super-slot 1000, a second UE to use a second super-slot 1010, and a third UE to use a third super-slot 1020. The first, second, and third super-slots are different in their respective search/data window sizes and/or signal repetition configurations.

In an NR network, a scheduling entity may transmit a synchronization signal block (SSB) in various patterns depending on subcarrier spacing and frequency range. The scheduling entity may inform the UE about the SSB transmission pattern via RRC signaling. In some aspects of the disclosure, a scheduling entity may transmit one or more SSB bursts within a DL portion of a super-slot. An SSB burst includes a number of SSB transmissions in a predetermined time window. The UE identifies the beam of the best SSB in the SSB burst and transmits a random access channel (RACH) message (e.g., RACH preamble) in a physical random access channel (PRACH) on a set of resources depending on the identified beam. The UE may transmit the PRACH in an UL portion of the super-slot. The UE uses the RACH process to acquire uplink synchronization and obtain access to the network.

In some aspects, the SSB burst may be associated with different beams, and the UE selects a certain UL beam (e.g., beam with strongest SSB) to send the RACH message. A RACH occasion (RO) is a resource area specified in time and frequency domain that is available for transmitting the RACH message. In an NR network, the SSB and RO are mapped together. Therefore, the scheduling entity can determine the UL beam that the UE selected for transmitting the RACH message by detecting which RO the UE used to send the RACH message. In some aspects of the disclosure, the time duration of a super-slot is proportional to a time period for the scheduling entity to maintain a same beam association pattern between the DL beam of the SSB and the UL beam of the RACH message from one or more RACH occasions.

In some aspects of the disclosure, the network may define various super-slot formats that can be stored and indexed in one or more super-slot format lookup tables. Therefore, network devices (e.g., scheduling entities) and scheduled entities (e.g., UEs) can signal the selected super-slot configuration (e.g., super-slot format) for use between the devices by signaling the corresponding table index of the lookup table that is known to both devices.

Figure 11:
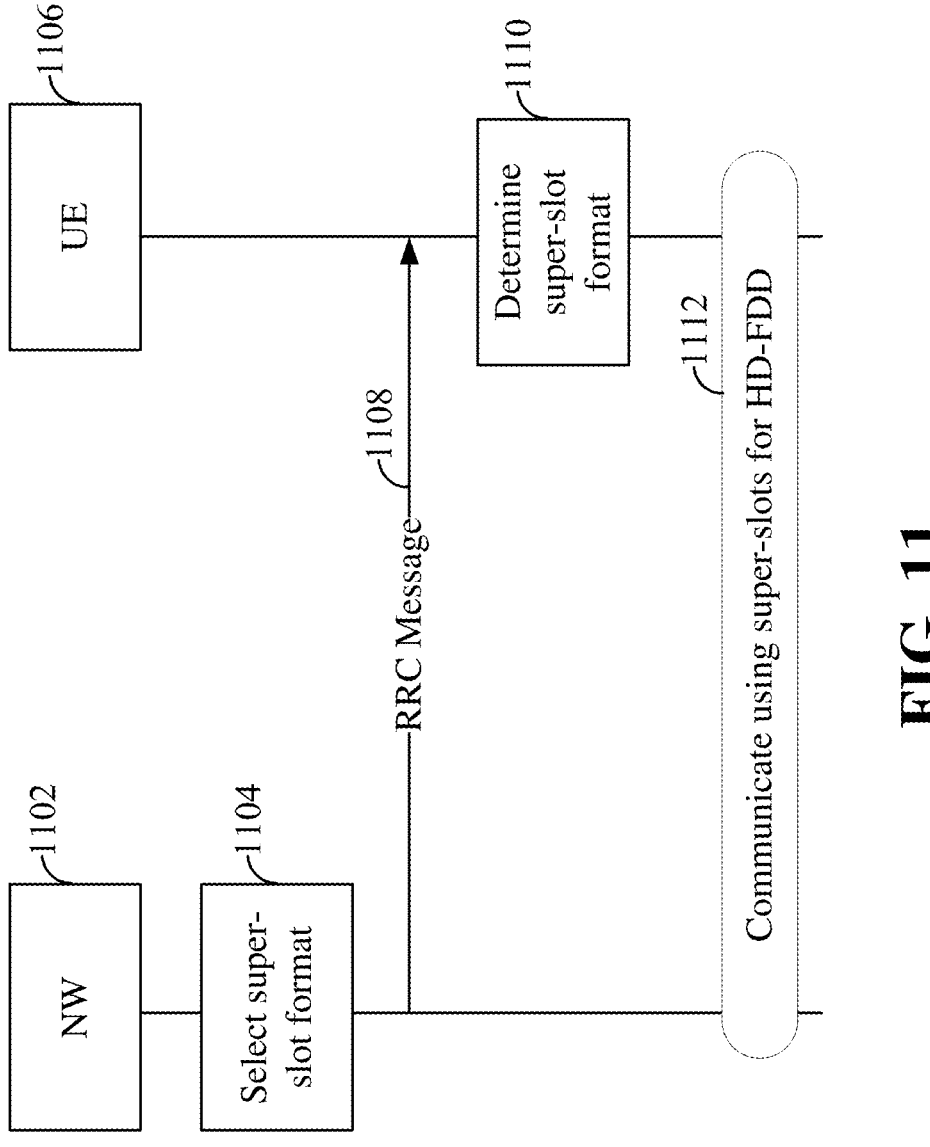
FIG. 11 is a diagram illustrating communication between a network and a user equipment (UE) for enabling HD-FDD communication using a super-slot according to some aspects of the disclosure.

FIG. 11 is a diagram illustrating communication between a network and a UE for enabling HD-FDD communication using a super-slot according to some aspects of the disclosure. At block 1104, a network entity 1102 selects a super-slot format for HD-FDD communication with a UE 1106. The network entity 1102 may be any of the scheduling entities (e.g., gNB) described above in relation to FIGS. 1-2. The network entity 1102 transmits an RRC message 1108 to the UE 1106. The RRC message 1108 indicates the selected super-slot format (e.g., super-slot configuration) to be used for HD-FDD communication between the network entity and the UE. In one example, the RRC message 1108 may include a table index of a predefined super-slot format lookup table that includes information on a plurality of super-slot formats.

Figure 12:
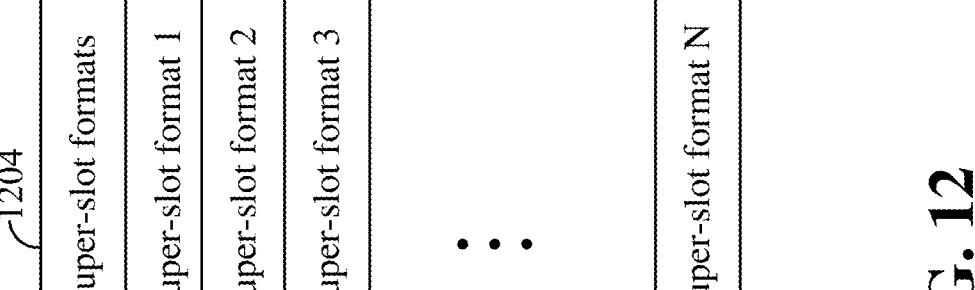
FIG. 12 is a drawing conceptually illustrating an exemplary super-slot format lookup table according to some aspects of the disclosure.

FIG. 12 is a drawing conceptually illustrating an exemplary super-slot format lookup table 1200 according to some aspects of the disclosure. For example, the network entity may signal a table index 1202 to indicate a corresponding super-slot format 1204 or slot configuration defined in the table 1200. The table provides the information and details for each super-slot format that has been predefined for a certain network. For example, the table 1200 may provide the information on the UL portion, DL portion, gap portion, search window(s), data window(s), UL numerology, DL numerology, UL frequencies, DL frequencies, and signal repetition information of each super-slot format defined in the table. Therefore, a network entity (e.g., gNB or base station) may signal only the table index to the scheduled entity (e.g., UE) without the overhead of transmitting the detailed information of the selected super-slot format.

Referring back to FIG. 11, at block 1110, the UE 1106 determines the super-slot format based on the super-slot configuration information contained in the RRC message 1108. For example, the UE may use a table index in the RRC message 1108 to locate a corresponding super-slot format in the super-slot format lookup table 1200. The UE may store a copy of the super-slot format table in its memory or storage. Then, the UE can obtain the detail of the selected super-slot format from the lookup table 1200. After that, the UE and the network entity can begin communicating 1112 with each other using the selected super-slot format using HD-FDD communication.

In some aspects of the disclosure, a network entity (e.g., scheduling entity) may select a cell-specific super-slot format that is different from the super-slot formats defined in the super-slot format lookup table 1200 as described above. In one example, the network entity may signal the selected super-slot format using semi-static signaling (e.g., RRC signaling) to one or more UEs. To that end, the network entity may include all configuration information of the cell-specific super-slot format in an RRC message.

Figure 13:
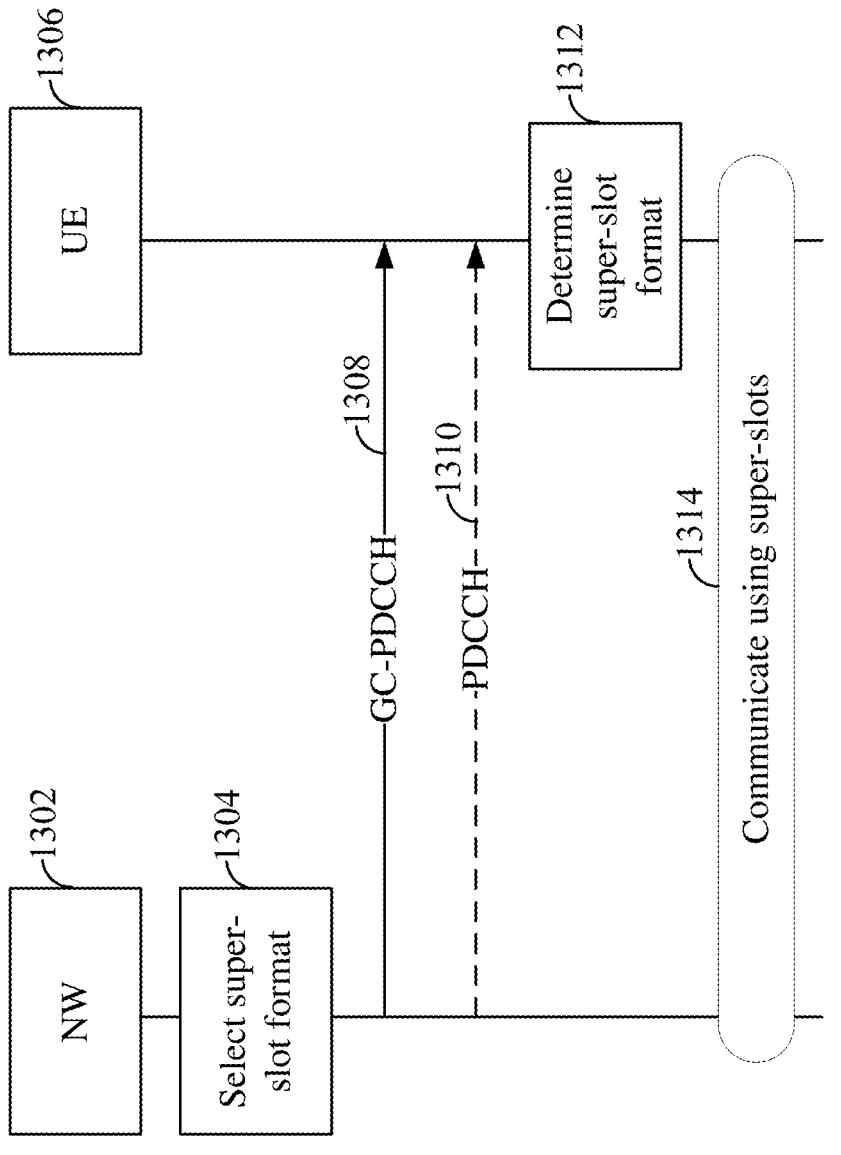
FIG. 13 is a diagram illustrating communication between a network and a UE for enabling HD-FDD communication using a super-slot according to some aspects of the disclosure.

In some aspects of the disclosure, a network entity may signal the selected super-slot format using dynamic signaling. FIG. 13 is a diagram illustrating communication between a network and a UE for enabling HD-FDD communication using a super-slot according to some aspects of the disclosure. At block 1304, a network entity 1302 selects a super-slot format for HD-FDD communication with a UE 1306. The network entity 1302 may be any of the scheduling entities (e.g., gNB) described above in relation to FIGS. 1-2. The network entity 1302 transmits information of the selected super-slot format using dynamic signaling to the UE 1306. For example, the network entity may transmit the super-slot information (slot configuration) in a DCI included in a group common physical downlink control channel (GC-PDCCH) 1308 to one or more UEs. In some examples, the GC-PDCCH may refer the UE 1306 to monitor a PDCCH 1310 that carries the super-slot information intended for the UE.

At block 1312, the UE 1306 determines the super-slot format based on the information obtained from the GC-PDCCH/PDCCH. In one example, the UE may use a table index received from the network entity to locate a corresponding super-slot format in a super-slot format lookup table 1200. The UE may store a copy of the super-slot format lookup table in its memory or storage. Then, the UE can determine the detail of the super-slot format from the table. After that, the UE and the network entity can begin communicating 1314 with each other using the selected super-slot format for HD-FDD communication. In some examples, the network entity 1302 may include all the super-slot information in the DCI without using a super-slot format lookup table.

Figure 14:
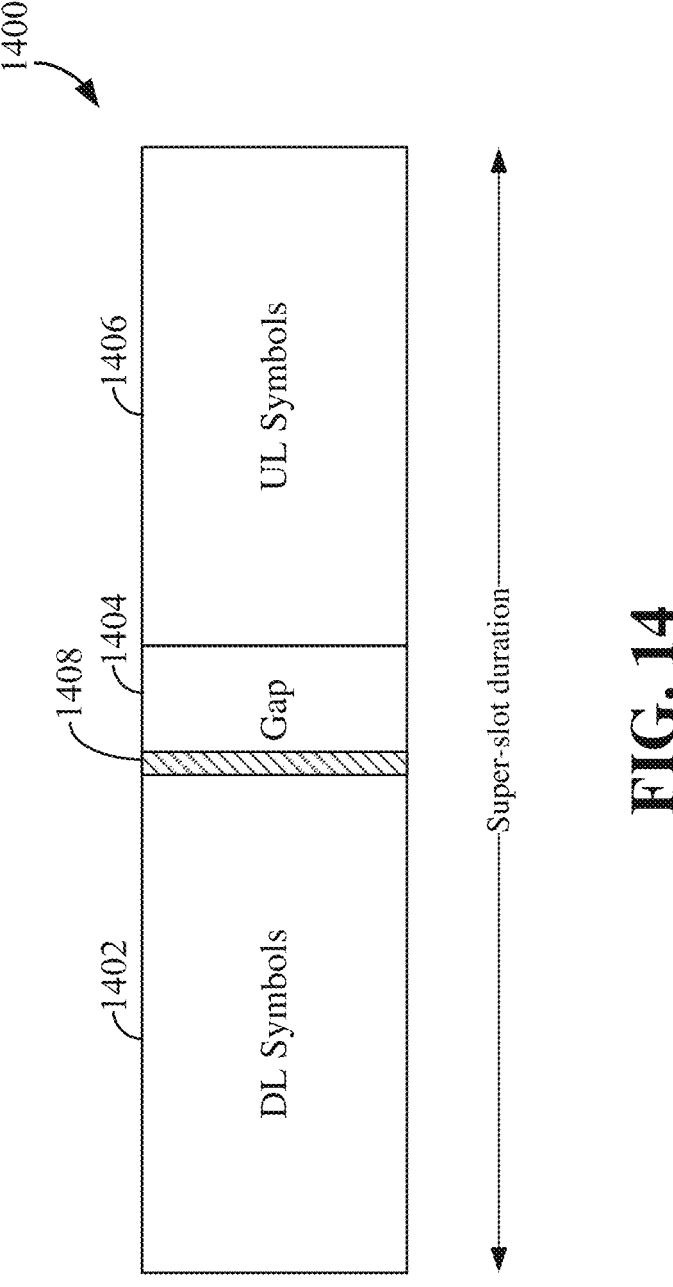
FIG. 14 is a block diagram illustrating an exemplary super-slot including an early indication for signaling super-slot format change.

In some aspects of the disclosure, a scheduling entity may provide an early indication of super-slot format change. FIG. 14 is a block diagram illustrating an exemplary super-slot 1400 including an early indication for signaling super-slot format change. The super-slot 1400 has a DL portion 1402, a gap portion 1404, and an UL portion 1406. A scheduling entity may transmit a pseudo-random noise (PN) sequence 1408 as an early indication within the symbols of the gap portion 1404 after the last symbol of the DL portion 1402. The PN sequence may be mapped to pre-configured frequency resources within a DL BWP of a DL carrier of a paired spectrum for HD-FDD. The resource mapping of the early indication signal may follow a frequency hopping pattern indicated by system information or radio resource control signaling.

Once the UE detects the PN sequence 1208 among the symbols of the gap portion, the UE may monitor a GC-PDCCH or an RRC signal scheduled in the DL portion of the next super-slot, which provides the information for a new configuration of a super-slot format, or the PN sequence may signal the cancellation/pre-emption of the ongoing HD-FDD transmission. The UE may detect the PN sequence using any known autocorrelation techniques. In some aspects of the disclosure, the PN sequence design can re-use or be based on a tracking reference signal (TRS) and/or its conjugate, with or without cover code. In some aspects, the PN sequence may be other predetermined sequences. In addition to early detection of super-slot format change, the UE can re-sync its timing tracking loops based on the PN sequence.

Figure 15:
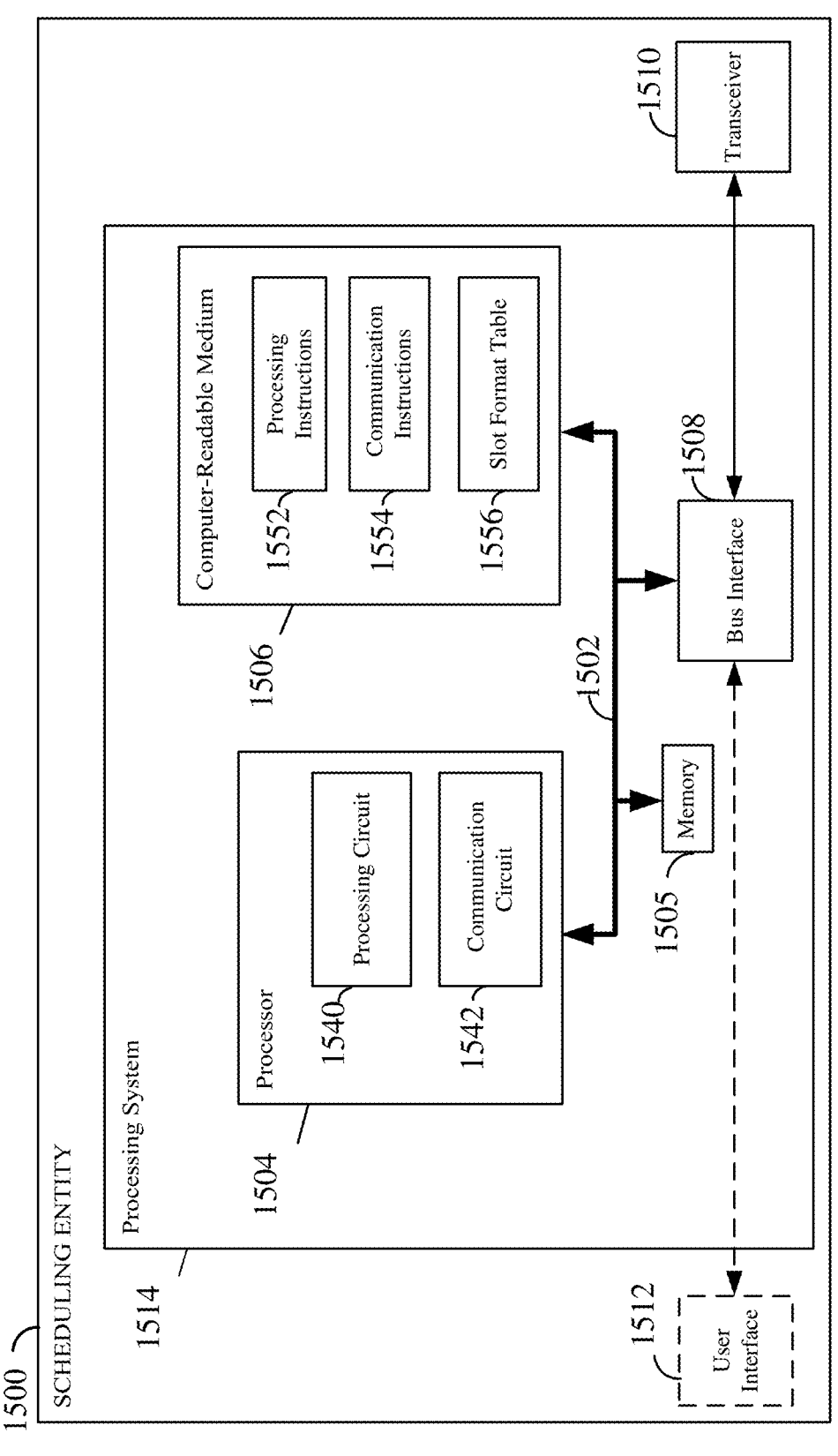
FIG. 15 is a block diagram conceptually illustrating an example of a hardware implementation for a scheduling entity according to some aspects of the disclosure.

FIG. 15 is a block diagram illustrating an example of a hardware implementation for a scheduling entity 1500 employing a processing system 1514. For example, the scheduling entity 1500 may be a base station (e.g., gNB) as illustrated in any one or more of FIGS. 1, 2, 11, and/or 13.

The scheduling entity 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1500 may be configured to perform any one or more of the functions described herein. That is, the processor 1504, as utilized in a scheduling entity 1500, may be used to implement any one or more of the processes and procedures described below and, for example, illustrated in FIG. 16.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a transmission medium. Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects of the disclosure, the processor 1504 may include a processing circuit 1540 and a communication circuit 1542. The processing circuit 1540 may be configured to perform various data and signal processing functions used in wireless communication, for example, HD-FDD communication. The processor 1504 may use the processing circuit 1540 to prepare data for transmission by the communication circuit 1542 and recover data from a signal received from the communication circuit 1542. The communication circuit 1542 may be configured to perform various functions used for UL and DL wireless communication using various duplex schemes, for example, HD-FDD via the transceiver 1510.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EE-PROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1506 may include software configured for various functions, including, processing instructions 1552 and communication instructions 1554. In one example, the processor 1504 may execute the processing instructions 1552 to perform various data processing functions used in wireless communication using HD-FDD as described in this disclosure. In one example, the processor 1504 may execute the communication instructions 1554 to perform UL and DL communication using HD-FDD as described in this disclosure. A super-slot format table 1556 may be stored at the computer-readable medium 1506 and/or the memory 1505. The super-slot format table includes a plurality of super-slot formats or configurations for facilitating HD-FDD communication as described in this disclosure.

FIG. 16 is a flow chart illustrating an exemplary process 1600 for wireless communication using a super-slot in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduling entity 1500 illustrated in FIG. 15. In some examples, the process 1600 may be carried out by any suitable apparatus or means for carrying out the functions or algorithm described below.

At block 1602, a scheduling entity 1500 provides a super-slot configuration to a UE. The super-slot configuration specifies a super-slot including a plurality of consecutive slots in a time domain The consecutive slots are grouped into at least one of an UL portion or a DL portion for wireless communication using HD-FDD. In one example, the super-slot may be any of the super-slots described above in relation to FIGS. 5-10. The scheduling entity may use the processing circuit 1540 to select a super-slot format from a super-slot format table 1556 stored at the computer-readable medium 1506. In one example, the super-slot format table 1556 may be similar to the super-slot format lookup table 1200 described above in relation to FIG. 1200.

At block 1604, the scheduling entity communicates with the UE using the super-slot. The scheduling entity may transmit and/or receive a signal that is repeated in the UL portion or the DL portion of the super-slot based on the super-slot configuration. In one example, the UL portion or DL portion may have at least one search window and at least one data window similar to those illustrated in FIGS. 9 and 10. The scheduling entity may use the communication circuit 1542 to transmit DL signals via the transceiver 1510. In some examples, the DL signals may be PDCCH, PDSCH, and/or CSI-RS. The scheduling entity may repeat the DL signals in one or more search/data windows in the DL portion based on the super-slot configuration. The scheduling entity may use the communication circuit 1542 to receive UL signals via the transceiver 1510. In some examples, the UL signals may be PUCCH, PUSCH, and/or SRS. The scheduling entity may receive repeated UL signals in one or more data windows in the UL portion based on the super-slot configuration.

In one aspect, the scheduling entity transmits an SSB using a DL beam in the DL portion, and receives a RACH message or preamble in the UL portion using an UL beam that has the same direction as the DL beam. In one aspect, the super-slot configuration specifies a time duration of the super-slot to be proportional to a time period for the sched- uling entity to maintain a same beam association pattern between the DL beam of the SSB and the UL beam of the RACH message from one or more RACH occasions. In one aspect, the super-slot further includes a gap portion for switching a communication direction of the UE from the DL portion to the UL portion.

In one aspect, the scheduling entity transmits an indica- tion signal in the gap portion to signal a format change of the super-slot, and the indication signal includes at least a pseudo random (PN) sequence that is mapped to pre- configured frequency resources within a DL bandwidth part (BWP) of a DL carrier of a paired spectrum used for HD-FDD. The resource mapping of the indication signal may follow a frequency hopping pattern indicated by system information or RRC signaling. The PN sequence may be based on a tracking reference signal (TRS). In one aspect, a time duration of the super-slot is based on a maximum of a subcarrier spacing (SCS) of an active UL BWP on an UL carrier and an SCS of an active DL BWP on a DL carrier of a paired spectrum for HD-HDD. In one aspect, the sched- uling entity transmits, to the UE, an index for looking up the super-slot configuration in a super-slot format lookup table. In one aspect, the scheduling entity transmits the index using system information, RRC signaling, or a group common physical downlink control channel (GC-PDCCH). In one aspect, the super-slot configuration specifies a first numer- ology for the UL portion and a second numerology for the DL portion. In one aspect, the first numerology and the second numerology may be different from each other. In one aspect, the first numerology and the second numerology may be the same. In one aspect, the super-slot configuration specifies one or more time windows in at least one of the UL portion or the DL portion for repeating the signal. In one aspect, the super-slot configuration specifics a first fre- quency band for repeating the signal in a first time window and a second frequency band for repeating the signal in a second time window, among the one or more time windows.

Figure 17:
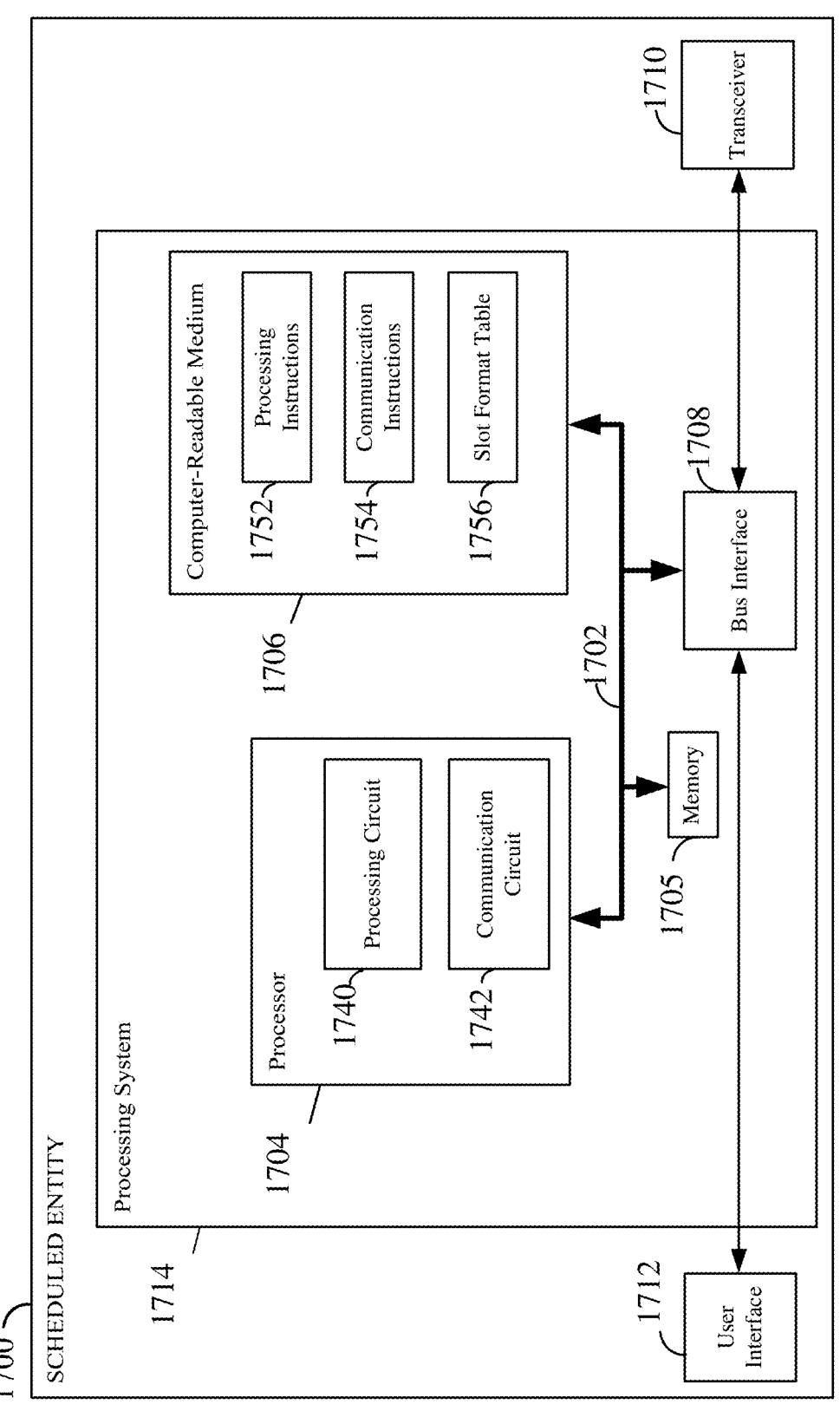
FIG. 17 is a block diagram conceptually illustrating an example of a hardware implementation for a user equipment according to some aspects of the disclosure.

FIG. 17 is a conceptual diagram illustrating an example of a hardware implementation for an exemplary scheduled entity 1700 employing a processing system 1714. In accor- dance with various aspects of the disclosure, an element, or any portion of an element, or any combination of elements may be implemented with a processing system 1714 that includes one or more processors 1704. For example, the scheduled entity 1700 may be a user equipment (UE) as illustrated in any one or more of FIGS. 1, 2, 11, and/or 13.

The processing system 1714 may be substantially the same as the processing system 714 illustrated in FIG. 7, including a bus interface 1708, a bus 1702, memory 1705, a processor 1704, and a computer-readable medium 1706. Furthermore, the scheduled entity 1700 may include a user interface 1712 and a transceiver 1710 substantially similar to those described above in FIG. 7. That is, the processor 1704, as utilized in a scheduled entity 1700, may be used to implement any one or more of the processes and functions described in this disclosure, for example, the processes illustrated in FIG. 18.

In some aspects of the disclosure, the processor 1704 may include a processing circuit 1740 and a communication circuit 1742. The processing circuit 1740 may be configured to perform various data and signal processing functions used in wireless communication, for example, HD-FDD commu- nication. The processor 1704 may use the processing circuit 1740 to prepare data for transmission by the communication circuit 1742 and recover data from a signal received by the communication circuit 1742. The communication circuit 1742 may be configured to perform various functions used for UL and DL wireless communication using various duplex schemes, for example, HD-FDD via the transceiver 1710.

In one or more examples, the computer-readable storage medium 1706 may include software configured for various functions, including, processing instructions 1752 and com- munication instructions 1754. In one example, the processor 1704 may execute the processing instructions 1752 to per- form various data processing functions used in wireless communication using HD-FDD as described in this disclo- sure. In one example, the processor 1704 may execute the communication instructions 1754 to perform various UL and DL communication using HD-FDD as described in this disclosure. A super-slot format table 1756 may be stored at the computer-readable medium 1706 and/or the memory 1705. The super-slot format table 1756 includes a plurality of super-slot formats for facilitating HD-FDD communica- tion as described in this disclosure.

FIG. 18 is a flow chart illustrating an exemplary process 1800 for wireless communication using HD-FDD in accor- dance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduled entity 1700 illustrated in FIG. 17. In some examples, the process 1800 may be carried out by any suitable apparatus or means for carrying out the functions or algorithm described below.

At block 1802, a scheduled entity 1700 (e.g., UE) receives a super-slot configuration from a scheduling entity (e.g., gNB). The super-slot configuration specifies a super-slot including a plurality of consecutive slots in a time domain The consecutive slots are grouped into at least one of an uplink (UL) portion or a downlink (DL) portion for wireless communication using HD-FDD. In one example, the super- slot may be any of the super-slots described above in relation to FIGS. 5-10. In one example, the super-slot configuration may include a table index, and the UE may use the process- ing circuit 1740 to select a super-slot format from a super- slot format table 1756 stored at the computer-readable medium 1706. In one example, the super-slot format table 1756 may be similar to the super-slot format lookup table 1200 described above in relation to FIG. 1200.

At block 1804, the UE communicates with the scheduling entity using the super-slot. The UE may transmit and/or receive a signal that is repeated in the UL portion or the DL portion of the slot based on the super-slot configuration. In one example, the UL portion or DL portion may have at least one search window and at least one data window similar to those illustrated in FIGS. 9 and 10. The UE may use the communication circuit 1742 to receive DL signals via the transceiver 1710. In some examples, the UE may receive DL signals including PDCCH, PDSCH, and/or CSI-RS in the DL portion. The UE may receive repeated DL signals in one or more search/data windows in the DL portion based on the super-slot configuration. The UE may use the communication circuit 1742 to transmit UL signals via the transceiver 1710. In some examples, the UE may transmit UL signals including PUCCH, PUSCH, and/or SRS in the UL portion. The UE may transmit repeated UL signals in one or more data windows in the UL portion based on the super-slot configuration.

In one aspect, the UE receives an SSB using a DL beam in the DL portion, and transmits a RACH message or preamble using an UL beam in the UL portion in the same direction as the DL beam. In one aspect, the super-slot configuration specifies a time duration of the super-slot to be proportional to a time period for the scheduling entity to maintain a same beam association pattern between the DL beam of the SSB and the UL beam of the RACH message from one or more RACH occasions. In one aspect, the super-slot further comprises a gap portion for switching a communication direction of the UE from the DL portion to the UL portion. In one aspect, the UE receives an indication signal in the gap portion to signal a super-slot format change, and the indication signal includes at least a PN sequence that is mapped to pre-configured frequency resources within a DL bandwidth part (BWP) of a DL carrier of a paired spectrum for HD-FDD. In one aspect, a resource mapping of the indication signal follows a frequency hopping pattern indicated by system information or RRC signaling. The PN sequence may be based on a tracking reference signal (TRS).

In one aspect, a time duration of the super-slot is based on a maximum of an SCS of an active UL BWP on an UL carrier and an SCS of an active DL BWP on a DL carrier of a paired spectrum for HD-FDD. In one aspect, the UE receives an index for looking up the super-slot configuration in a super-slot format lookup table. In one aspect, the UE receives the index using system information broadcasted by the scheduling entity, RRC signaling, or GC-PDCCH. In one aspect, the super-slot configuration specifies a first numerology for the UL portion and a second numerology for the DL portion. In one aspect, the first numerology and the second numerology are different from each other. In one aspect, the first numerology and the second numerology are the same. In one aspect, the super-slot configuration specifies one or more time windows in at least one of the UL portion or the DL portion for repeating the signal.

In one configuration, the apparatus 1500 and/or 1700 for wireless communication includes means for various functions including the functions, processes, and methods described in this disclosure. In one aspect, the aforementioned means may be the processor(s) 1504/1704 shown in FIG. 1500/1700 configured to perform the functions recited by the aforementioned means. In another aspect, the aforementioned means may be a circuit or any apparatus configured to perform the functions recited by the aforementioned means.

Of course, in the above examples, the circuitry included in the processor 1504/1704 is merely provided as an example, and other means for carrying out the described functions may be included within various aspects of the present disclosure, including but not limited to the instructions stored in the computer-readable storage medium 1506/1706, or any other suitable apparatus or means described in any one of the FIGS. 1, 2, 11, and/or 13, and utilizing, for example, the processes and/or algorithms described herein in relation to FIGS. 16 and/or 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication at a scheduling entity, comprising:
    providing an index to a user equipment (UE), the index configured to look up a slot configuration in a lookup table comprising a plurality of slot formats, the lookup table comprising repetition information of each of the plurality of slot formats defined in the lookup table;
    the slot configuration specifying a plurality of consecutive slots in a time domain, the plurality of consecutive slots grouped into at least one of an uplink (UL) portion or a downlink (DL) portion for wireless communication; and
    communicating with the UE using the plurality of consecutive slots, comprising at least one of transmitting or receiving a signal that is repeated in the UL portion or the DL portion based on the slot configuration.

2. The method of claim 1, wherein the signal comprises a repetition of a DL signal including at least one of a physical downlink control channel (PDCCH), a physical downlink shared channel (PDSCH), or a channel-state information reference signal (CSI-RS).

3. The method of claim 1, wherein the signal comprises a repetition of an UL signal comprising at least one of a physical uplink control channel (PUCCH), a physical uplink shared channel (PUSCH), or a sounding reference signal (SRS).

4. The method of claim 1, wherein communicating with the UE further comprises:
    transmitting a synchronization signal block (SSB) in the DL portion using a first beam; and
    receiving a random access channel (RACH) message in the UL portion using a second beam in a same direction as the first beam.

5. The method of claim 4, wherein the slot configuration specifies a time duration of the plurality of consecutive slots to be proportional to a time period for the scheduling entity to maintain a same beam association pattern between the first beam of the SSB and the second beam of the RACH message from one or more RACH occasions.

6. The method of claim 1, wherein the slot configuration further specifies a gap portion to facilitate switching a communication direction of the UE from the DL portion to the UL portion.

7. The method of claim 1, wherein a time duration of the plurality of consecutive slots is based on a maximum of a subcarrier spacing (SCS) of an active UL bandwidth part (BWP) on an UL carrier and an SCS of an active DL BWP on a DL carrier of a paired spectrum.

8. The method of claim 1, further comprising at least one of:
    transmitting the index using system information broadcasted by the scheduling entity;
    transmitting the index using radio resource control signaling; or
    transmitting the index using a group common physical downlink control channel (GC-PDCCH).

9. The method of claim 1, wherein the slot configuration specifies a first numerology for the UL portion and a second numerology for the DL portion.

10. The method of claim 9, wherein the first numerology and the second numerology are different from each other.

11. The method of claim 9, wherein the first numerology and the second numerology are the same.

12. The method of claim 1, wherein the slot configuration specifies one or more time windows in at least one of the UL portion or the DL portion for repeating the signal.

13. The method of claim 12, wherein the slot configuration further specifies a first frequency band for repeating the signal in a first time window and a second frequency band for repeating the signal in a second time window, among the one or more time windows.

14. A method of wireless communication at a user equipment (UE), comprising:
    receiving an index configured to look up a slot configuration in a lookup table comprising a plurality of slot formats, the lookup table comprising repetition information of each of the plurality of slot formats defined in the lookup table;
    the slot configuration specifying a plurality of consecutive slots in a time domain, the plurality of consecutive slots grouped into at least one of an uplink (UL) portion or a downlink (DL) portion for wireless communication with a scheduling entity; and
    communicating with the scheduling entity using the plurality of consecutive slots, comprising at least one of transmitting or receiving a signal that is repeated in the UL portion or the DL portion based on the slot configuration.

15. The method of claim 14, wherein the signal comprises a repetition of a DL signal including at least one of a physical downlink control channel (PDCCH), a physical downlink shared channel (PDSCH), or a channel-state information reference signal (CSI-RS).

16. The method of claim 14, wherein the signal comprises a repetition of an UL signal including at least one of a physical uplink control channel (PUCCH), a physical uplink shared channel (PUSCH), or a sounding reference signal (SRS).

17. The method of claim 14, wherein communicating with the scheduling entity further comprises:
    receiving a synchronization signal block (SSB) in the DL portion using a first beam; and
    transmitting a random access channel (RACH) message in the UL portion using a second beam in a same direction as the first beam.

18. The method of claim 17, wherein the slot configuration specifies a time duration of the plurality of consecutive slots to be proportional to a time period for the scheduling entity to maintain a same beam association pattern between the first beam of the SSB and the second beam of the RACH message from one or more RACH occasions.

19. The method of claim 14, wherein the slot configuration further specifies a gap portion to facilitate switching a communication direction of the UE from the DL portion to the UL portion.

20. The method of claim 14, wherein a time duration of the plurality of consecutive slots is based on a maximum of a subcarrier spacing (SCS) of an active UL bandwidth part (BWP) on an UL carrier and an SCS of an active DL BWP on a DL carrier of a paired spectrum.

21. The method of claim 14, further comprising at least one of:
  receiving the index using system information broadcasted by the scheduling entity;
  receiving the index using radio resource control signaling; or
  receiving the index using a group common physical downlink control channel (GC-PDCCH).

22. The method of claim 14, wherein the slot configuration specifies a first numerology for the UL portion and a second numerology for the DL portion.

23. The method of claim 22, wherein the first numerology and the second numerology are different from each other.

24. The method of claim 22, wherein the first numerology and the second numerology are the same.

25. The method of claim 14, wherein the slot configuration specifies one or more time windows in at least one of the UL portion or the DL portion for repeating the signal.

26. The method of claim 25, wherein the slot configuration further specifics a first frequency band for repeating the signal in a first time window and a second frequency band for repeating the signal in a second time window, among the one or more time windows.

27. A network entity for wireless communication comprising:
  one or more memories; and
  one or more processors coupled with the one or more memories, the one or more processors being configured to cause the network entity to:
  provide an index to a user equipment (UE), the index configured to look up a slot configuration in a lookup table comprising a plurality of slot formats, the lookup table comprising repetition information of each of the plurality of slot formats defined in the lookup table;
  the slot configuration specifying a plurality of consecutive slots in a time domain, the plurality of consecutive slots grouped into at least one of an uplink (UL) portion or a downlink (DL) portion for wireless communication; and
  communicate, with the UE using the plurality of consecutive slots, comprising at least one of transmitting or receiving a signal that is repeated in the UL portion or the DL portion based on the slot configuration.

28. The apparatus of claim 27, wherein the signal comprises a repetition of an UL signal comprising at least one of a physical uplink control channel (PUCCH), a physical uplink shared channel (PUSCH), or a sounding reference signal (SRS).

29. The network entity of claim 27, wherein the signal comprises a repetition of a DL signal including at least one of a physical downlink control channel (PDCCH), a physical downlink shared channel (PDSCH), or a channel-state information reference signal (CSI-RS).

30. The network entity of claim 27, wherein, to communicate with the UE, the one or more processors are further configured to cause the network entity to:
  transmit a synchronization signal block (SSB) in the DL portion using a first beam; and
  receive a random access channel (RACH) message in the UL portion using a second beam in a same direction as the first beam.

31. The network entity of claim 30, wherein the slot configuration specifies a time duration of the plurality of consecutive slots to be proportional to a time period for the network entity to maintain a same beam association pattern between the first beam of the SSB and the second beam of the RACH message from one or more RACH occasions.

32. The network entity of claim 27, wherein the slot configuration further specifies a gap portion to facilitate switching a communication direction of the UE from the DL portion to the UL portion.

33. The network entity of claim 27, wherein the one or more processors are further configured to cause the network entity to, at least one of:
  transmit the index using system information broadcasted by the network entity;
  transmit the index using radio resource control signaling; or
  transmit the index using a group common physical downlink control channel (GC- PDCCH).

34. The network entity of claim 27, wherein the slot configuration specifies a first numerology for the UL portion and a second numerology for the DL portion.

35. The network entity of claim 34, wherein the first numerology and the second numerology are different from each other.

36. The network entity of claim 34, wherein the first numerology and the second numerology are the same.

37. The network entity of claim 27, wherein the slot configuration specifies one or more time windows in at least one of the UL portion or the DL portion for repeating the signal.

38. The network entity of claim 37, wherein the slot configuration further specifics a first frequency band for repeating the signal in a first time window and a second frequency band for repeating the signal in a second time window, among the one or more time windows.

39. A user equipment (UE) for wireless communication comprising:
  one or more memories; and
  one or more processors coupled with the one or more memories,
  the one or more processors being configured to cause the UE to:
  receive an index configured to look up a slot configuration in a lookup table comprising a plurality of slot formats, the lookup table comprising repetition information of each of the plurality of slot formats defined in the lookup table;
  the slot configuration specifying a plurality of consecutive slots in a time domain, the plurality of consecutive slots grouped into at least one of an uplink (UL) portion or a downlink (DL) portion for wireless communication with a scheduling entity; and
  communicate with the scheduling entity using the plurality of consecutive slots, comprising at least one of transmitting or receiving a signal that is repeated in the UL portion or the DL portion based on the slot configuration.

40. The UE of claim 39, wherein the signal comprises a repetition of an UL signal comprising at least one of a physical uplink control channel (PUCCH), a physical uplink shared channel (PUSCH), or a sounding reference signal (SRS).

41. The UE of claim 39, wherein the signal comprises a repetition of a DL signal including at least one of a physical downlink control channel (PDCCH), a physical downlink shared channel (PDSCH), or a channel-state information reference signal (CSI-RS).

42. The UE of claim 39, wherein, to communicate with the scheduling entity, the one or more processors are further configured to cause the UE to:

receive a synchronization signal block (SSB) in the DL portion using a first beam; and transmit a random access channel (RACH) message in the UL portion using a second beam in a same direction as the first beam.

43. The UE of claim 42, wherein the slot configuration specifies a time duration of the plurality of consecutive slots to be proportional to a time period for the UE to maintain a same beam association pattern between the first beam of the SSB and the second beam of the RACH message from one or more RACH occasions.

44. The UE of claim 39, wherein the slot configuration further specifies a gap portion to facilitate switching a communication direction of the UE from the DL portion to the UL portion.

45. The UE of claim 39, wherein the one or more processors are further configured to cause the UE to, at least one of:

receive the index using system information broadcasted by the scheduling entity;

receive the index using radio resource control signaling; or receive the index using a group common physical downlink control channel (GC-PDCCH).

46. The UE of claim 39, wherein the slot configuration specifies a first numerology for the UL portion and a second numerology for the DL portion.

47. The UE of claim 46, wherein the first numerology and the second numerology are different from each other.

48. The UE of claim 46, wherein the first numerology and the second numerology are the same.

49. The UE of claim 39, wherein the slot configuration specifies one or more time windows in at least one of the UL portion or the DL portion for repeating the signal.

50. The UE of claim 49, wherein the slot configuration further specifics a first frequency band for repeating the signal in a first time window and a second frequency band for repeating the signal in a second time window, among the one or more time windows.

* * * * *